United States Patent [19]
Richter et al.

[11] Patent Number: 5,581,178
[45] Date of Patent: Dec. 3, 1996

[54] METHOD OF AND DEVICE FOR CONTACTLESS MEASUREMENT OF ROTARY SPEED OF DIRECT CURRENT MOTOR BY FORMING AUTOCORRELATION SEQUENCE

[75] Inventors: Ingo Richter, Markgroeningen; Klaus Skibowski, Sersheim, both of Germany

[73] Assignee: Robert Bosch GmbH, Stuttgart, Germany

[21] Appl. No.: 221,044

[22] Filed: Mar. 30, 1994

[30] Foreign Application Priority Data

Apr. 6, 1993 [DE] Germany ............... 43 11 182.3

[51] Int. Cl.$^6$ ............... G01P 3/44; G01P 3/46
[52] U.S. Cl. ............... 324/177; 324/160; 364/565
[58] Field of Search ............... 324/160, 163, 324/166, 168, 177; 364/565

[56] References Cited

U.S. PATENT DOCUMENTS

| | | | |
|---|---|---|---|
| 3,404,339 | 10/1968 | Mitchell | 324/177 X |
| 4,684,858 | 8/1987 | Ma et al. | 324/177 X |
| 4,744,041 | 5/1988 | Strunk et al. | 324/177 X |
| 5,005,144 | 4/1991 | Nakajima et al. | 364/565 |
| 5,424,636 | 6/1995 | Rollwage et al. | 324/177 |

FOREIGN PATENT DOCUMENTS 4133269  4/1993  Germany.

*Primary Examiner*—Gerard R. Strecker
*Attorney, Agent, or Firm*—Michael J. Striker

[57] ABSTRACT

A method of and an arrangement for rotary speed determination in an electric motor is used to determine an instantaneous motor rotary speed from an alternating portion of the current caused by switching on and off of the commutator with a recognizable periodicity. An endless autocorrelation sequence is formed, and the rotary value is determined from the distance between the maxima or minima of the auto-correlation sequence. In combination with a further method for rotary speed determination from the alternating portion of the current with the use of twice fourier transformations, a very reliable and error-free rotary speed determination is provided.

16 Claims, 3 Drawing Sheets

5,581,178

1

METHOD OF AND DEVICE FOR CONTACTLESS MEASUREMENT OF ROTARY SPEED OF DIRECT CURRENT MOTOR BY FORMING AUTOCORRELATION SEQUENCE

BACKGROUND OF THE INVENTION

The present invention relates to a method of and an arrangement for contactless rotary speed measurements.

More particularly, it relates to a method of measurements of the rotary speed of a rotating part, in particular a part which is surrounded by a housing.

For determination of a rotary speed of a rotating part usually markings are applied on the rotating part and then sensed by a special sensor, for example an inductive sensor. When the rotating parts are completely surrounded by a housing, such a rotary speed determination is no longer possible. In electric fuel pumps, in particular, which are completely encapsuled, there are no rotating parts which extend outwardly so that other rotary speed measurements are required.

German document DE-P 41 33 269 which corresponds to U.S. patent application Ser. No. 070,425, now U.S. Pat. No. 5,424,636 discloses a rotary speed determination in accordance with which, and especially in connection with a measurement of a rotary speed of the electric fuel pump, the current signal of the electric fuel pump is evaluated. By alternating current supply of the armature winding during the rotation of the armature, rotary speed dependent current fluctuations are produced. These current fluctuations which occur with a rotary speed-dependent frequency are digitalized by sensing the current signal and twice fourier transformed in a computer device. After the second fourier transformation a spectrum is obtained in which the rotary speed is determined directly from the absolute maximum.

SUMMARY OF THE INVENTION

Accordingly, it is an object of the present invention to provide a method of and an arrangement for contactless rotary speed measurement which is a further improvement of the existing methods and arrangements.

In keeping with these objects and with others which will become apparent hereinafter, one feature of the present invention resides, briefly stated, in a method of measuring a rotary speed of a rotating part surrounding by a housing, in accordance with which a signal dependent from the rotary speed is determined, the signal is filtered, sensed and digitalized, an auto-correlation sequence is formed from the digitalized signal in a computer device, and the rotary speed is determined from its maxima and/or minima by evaluating the distance between at least two successive maxima or minima.

In accordance with another feature of the present invention, an arrangement is proposed which has a measuring device for providing current signals dependent from the rotary speed, a band pass filter, an amplifier and an analog/digital converter to which the signal is supplied, and a computer which is connected with the latter and outputs the rotary speed through an output unit.

When the method is performed and the arrangement is designed in accordance with the present invention, it is possible with a representative computer expense to provide a relatively reliable and accurate representation of the rotary

2 speed of a direct current motor, without an additional rotary speed sensor.

The current signal of the direct current motor is sensed, and the current fluctuations produced during alternating current supply of the armature windings during the rotation of the armature which represent an alternating portion of the current and occur with an exactly determined rotary speed dependent frequency, are processed in a computer device in a suitable manner. After sensing the current signal with a sufficiently high sensing rate and a sufficient number of sensing points an auto-correlation sequence is formed. This auto-correlation sequence is periodical, and the evaluation of the period, for example the evaluation of the distances between the maxima of the auto-correlation sequence corresponds to the direct measure for the desired rotary speed.

When the rotary speed is formed not only from the distance between two maxima but by an average value of the distances of several maxima or minima, the accuracy of the rotary speed determination is increased.

A further feature of the present invention is that the dependency of the reliable determination of the rotary speed from the selected frequency of determination of the current signal is substantially lower than in known solutions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
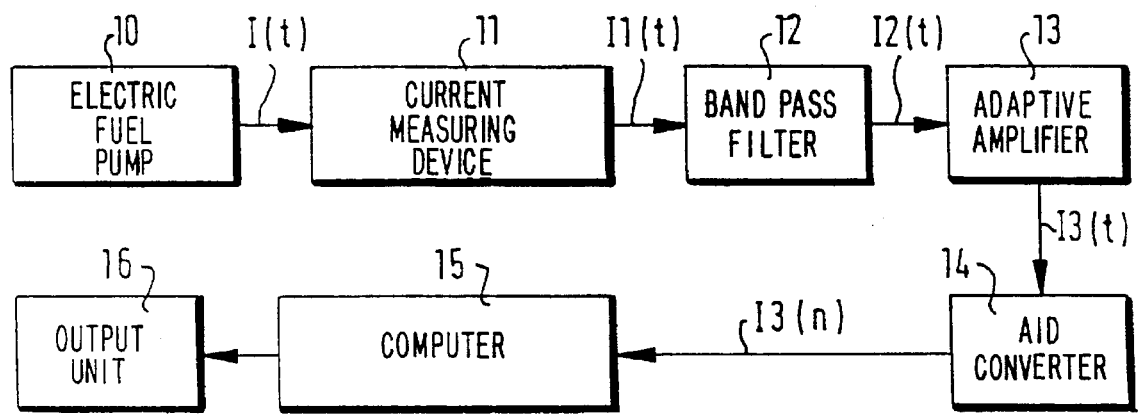
FIG. 1 is a view schematically showing an arrangement for performing a method of measurement in accordance with the present invention.

FIG. 1 shows an arrangement for performing an inventive method in form of a block diagram. Reference numeral 10 identifies an electric fuel pump as an example of a direct current electric motor whose rotary speed D must be determined. Reference numeral 11 identifies a current measuring device which measures a current signal I(t) or a magnetic field caused by the current signal of the electric fuel pump 10 and produces a current signal I1(t).

A band pass filter 12 is connected with the measuring device 11 for separation of the direct current portion of the current and for cutting out the higher frequency portions of the signal. The thus obtained current I2(t) is amplified for further processing in a subsequently arranged amplifier 13 which for example can be an adaptive amplifier with a changeable amplification factor.

Figure 2:
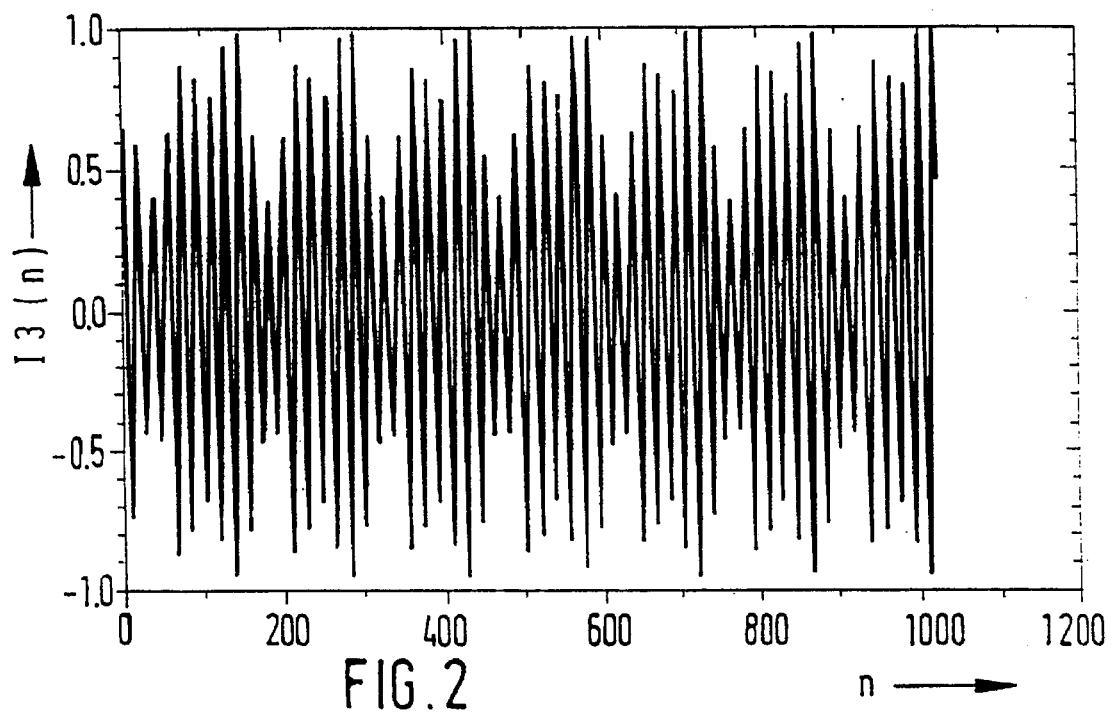
FIG. 2 is a view showing a sensed current course through discrete sensing point n.

An analog/digital converter 14 digitalizes the signal I3(t). The thusly produced signal I3(n) is shown in FIG. 2. The further evaluation is performed in a computer 15, for example by a signal processor which produces the determined rotary speed D through an output unit identified by reference numeral 16. The analog/digital converter 14 can be a component of the computer 15, and can be controlled by it.

The electric fuel pump identified with reference numeral 10 whose rotary speed n must be determined can be any electric pump which is completely surrounded by a housing, so that no rotatable parts are available. It is to be understood that the invention can be expanded also to any direct current electric motors.

The electric current supplied to the electric fuel pump 10 which causes a rotation of the armature is in some cases influenced by an electric motor, which current is evaluated in accordance with the present invention. By alternating current supply of the armature windings of the pump, during rotation periodic current fluctuations are produced. These current fluctuations are dependent on the rotary speed and are used for determination of the rotary speed, wherein first a so-called current form diagram I3(n) is determined.

The current in a direct current motor has in addition to a direct current portion, also an alternating portion produced by the switching on and off at the commutator. The alternating portion of the current I3(n) of a direct current motor measured by the device of FIG. 1 is shown in FIG. 2. In the recognized periodicity of the signal as mentioned above, the information about the instantaneous motor rotary speed is contained. The periodicity is caused substantially by the commutator steps at the commutator. For determination of this periodicity the signal is digitalized and sensed by a computer 15. In this computer the time course is stored.

A final auto-correlation sequence AKF (i) is determined from a sufficiently great number n of the sensed values (signal values) x, produced in accordance with the following equation:

$$AKF(i) = \sum_{j=0}^{m} x(j) * x(j+i) \text{ for } i = 0 \ldots n.$$

This equation is known for example from Kammeyer U. D.-/Kroschel K.: Digitale Signalverarbeitung und Spektralanalyse, B. G. Teubner-Verlag, 1989, Stuttgart.

The selection of the values n and m is dependent on the number N of the obtained sensing value x whose instantaneous values are utilized for computation of the AKF, from the required accuracy and the permissible computation time. The selection can be obtained empirically.

For example it can recommended with a selected number of the sensing points N=1024, to provide the value n and m correspondingly n=200 and m=200. These values provide for this case a good compromise between the computing and the accuracy of the results.

Figure 3:
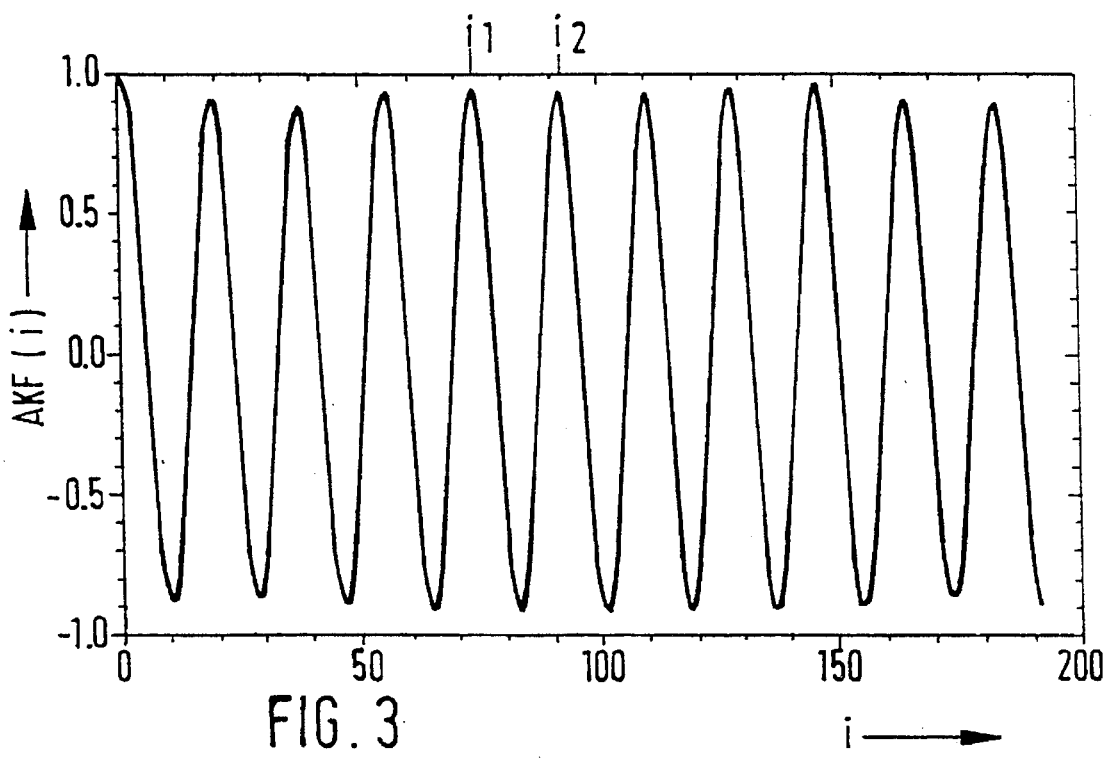
FIG. 3 shows a computed auto-correlation sequence in accordance with the inventive method.
Figure 4:
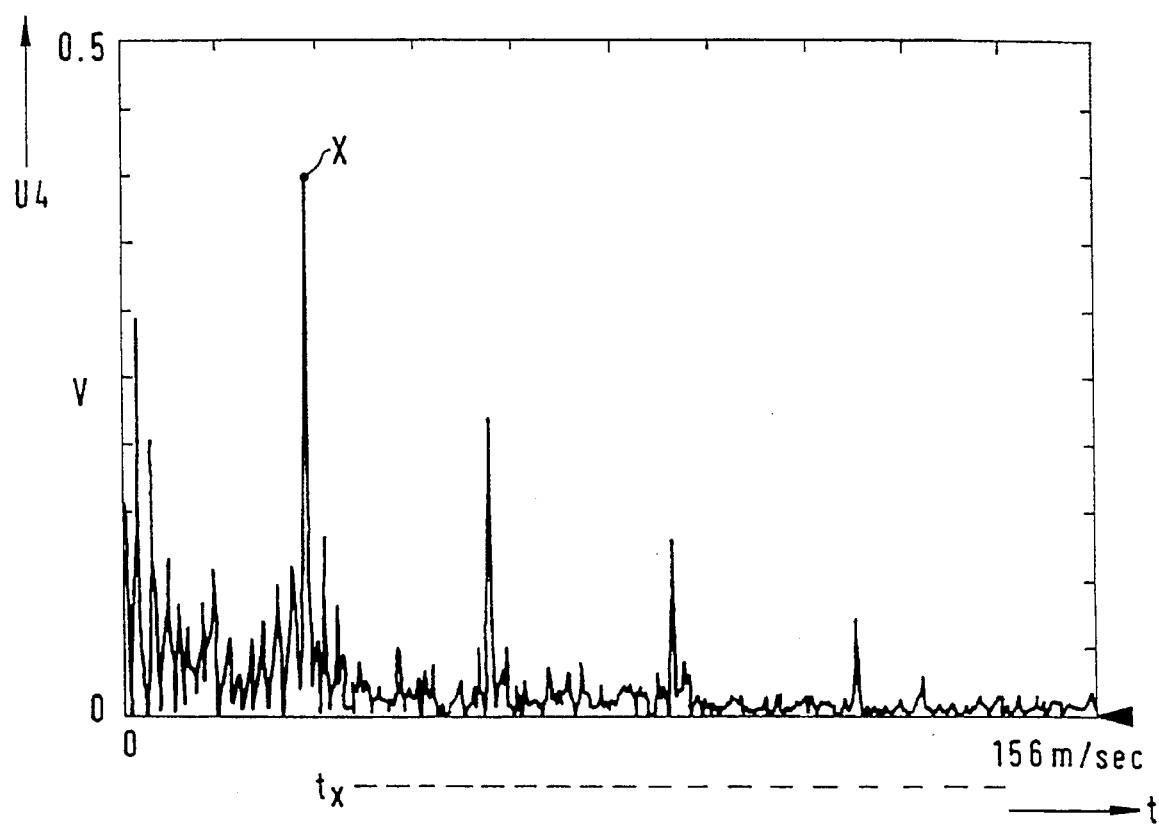
FIG. 4 is a view showing a spectrum obtained after a twice fourier transformation.

When suitable values for n and m are selected, an auto-correlation sequence AKF(i) is produced as shown in FIG. 3. From this auto-correlation sequence AKF(i) the rotary speed can be determined, by evaluating the difference of the positions i1 and i2 of two successive maxima or minima. The rotary speed is calculated as follows:

$$D = (60 * f_a)/((i2-i1)*k),$$

wherein $f_a$ is a sensing frequency, k is a number of commutator segments. In the example of FIG. 2 with an 8 segment direct current motor k=8.

The evaluatable positions i1 and i2 are shown for example in FIG. 3.

The accuracy of the determined rotary speed value can be increased. In particular it can be achieved that the rotary speed is formed not only from the distance between two successive maxima or successive minima, but in that the distances between several or all evaluatable maxima or minima are determined and an average value is formed.

A further possibility to increase the accuracy during the rotary speed determination resides in that the position of the maxima and minima is accurately determined by interpolation by means of a suitable algorhythm in a computer.

With the above described method the rotary speed of an electric motor can be reliably determined. The method of the rotary speed determination by means of an auto-correlation sequence can be also used in connection or in combination with a method of rotary speed determination by a twice fast fourier transformation disclosed in the above mentioned German patent document DE-P 41 33 269. The contents of this patent document is therefore incorporated here by reference.

In the above mentioned case an estimate rate D* can be determined with the described rotary speed determination by an auto-correlation sequence AKF(i) for the rotary speed. With this estimate rate D, the parameter required for the reliable evaluation in accordance with the first fourier transformation (FFT), especially a suitable sensing rate with which the current signal is tested during digitalizing, can be estimated. As a result the method becomes more reliable with respect to avoiding false measurements.

The fourier transformations are performed with a fourier transformation card which can be a component of the computer. From the current signal after the twice fourier transformation a spectrum U4(t) can be produced which has an absolute maximum X(t) proportional to the rotary speed. By determining the time corresponding to this maximum the rotary speed can be counted from the inverse value of the time.

The estimated rate determined from the AKF(I) for the rotary speed can be additional point for the determination of the sensing rate for the next formation of an AKF(i).

It will be understood that each of the elements described above, or two or more together, may also find a useful application in other types of methods and constructions differing from the types described above.

While the invention has been illustrated and described as embodied in a method of and an arrangement for contactless rotary speed measurements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of determining a rotary speed of a rotating part to which a current signal is fed to activate a rotation and which is surrounded by a housing, comprising the steps of producing signals dependent on the rotary speed by sensing a current signal I(t) fed to the rotating part; faltering the signal; sensing and digitalizing the filtered signal to form a plurality of sensed values of the digitalized signal; forming in a computer device from the digitalized signal values an auto-correlation sequence containing maxima and minima of the sensed values, whereby the auto-correlation sequence is a limited one and selecting a number of the sensed values in dependence on a desired accuracy and availability of a computer capacity, and determining the rotary speed by evaluating a distance between at least two successive maxima or minima of the selected sensed.

2. A method as defined in claim 1, wherein said determining the rotary speed includes determining a rotary speed from a distance between two neighboring maxima of the auto-correlation sequence.

3. A method as defined in claim 1, wherein said determining the rotary speed includes determining a rotary speed from a distance between two neighboring minima of the auto-correlation sequence.

4. A method as defined in claim 1, wherein the rotating part is an armature of an electric fuel pump.

5. A method as defined in claim 4, wherein the signal is a current signal of the electric fuel pump.

6. A method as defined in claim 4, wherein the signal is a magnetic signal of the electric fuel pump.

7. A method as defined in claim 1, wherein said forming includes forming an auto-correlation sequence in a computer.

8. A method as defined in claim 7, wherein the computer is a microcomputer.

9. A method as defined in claim 1; and further comprising the step of using the determined rotary speed as an estimate rate which is used for determination of a sensing rate with which the current signal is evaluated in a next evaluation.

10. A method as defined in claim 9, wherein said forming includes twice fourier transforming the signal for producing a spectrum, determining the rotary speed by evaluating of an absolute maximum available in the twice fourier transformed spectrum, and taking into consideration a parameter of the fourier transformation of the previously determined rotary speed estimate rate to form the auto-correlation sequence.

11. A method as defined in claim 10, wherein the rotary speed is determined by determination of a time associated with the maximum which is inversely proportional to the rotary speed.

12. An arrangement for measuring a rotary speed of a rotatable part to which a current signal is fed to activate a rotation and which is surrounded by a housing, comprising a measuring device for measuring the current signal I(t) and producing from said measured current signal a signal dependent on the rotary speed of said rotatable part; means for filtering the produced signal; means for sensing said filtered signals at a selected rate and digitalizing the filtered signal to form a plurality of sensed values of the digitalized signal; computing means for forming from the digitalized signals an auto-correlation sequence having maxima and minima; means for selecting a number of the sensed values of the digitalized signal in dependence on a desired accuracy and availability of a computer capacity; and means for determining the rotary speed from the maxima or minima of the auto-correlation sequence by evaluating a distance between at least two successive maxima or minima of the selected sensed values.

13. An arrangement as defined in claim 12, wherein said device for producing signals is a current measuring device, said filtering means is a band pass filter, said digitalizing means is analog-digital converter, and said computing means is a computer.

14. An arrangement as defined in claim 13; and further comprising an amplifier provided between said band pass filter and said analog/digital converter.

15. An arrangement as defined in claim 13; and further comprising an output unit connected with said computer for outputting the rotary speed.

16. An arrangement as defined in claim 13, wherein said computer has a region for forming the auto-correlation sequence and a region for performing fourier transformations.

* * * * *